(12) United States Patent
Jin et al.

(10) Patent No.: US 11,588,908 B2
(45) Date of Patent: Feb. 21, 2023

(54) METHOD, APPARATUS AND DEVICE FOR GENERATING MICROSERVICE, AND STORAGE MEDIUM

(71) Applicant: ZTE CORPORATION, Guangdong (CN)

(72) Inventors: Feicai Jin, Guangdong (CN); Daokui Wu, Guangdong (CN); Yuanyuan Liu, Guangdong (CN); Yiwei Tang, Guangdong (CN); Shuangping Wen, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/297,285

(22) PCT Filed: Nov. 19, 2019

(86) PCT No.: PCT/CN2019/119447
§ 371 (c)(1),
(2) Date: May 26, 2021

(87) PCT Pub. No.: WO2020/108348
PCT Pub. Date: Jun. 4, 2020

(65) Prior Publication Data
US 2022/0030074 A1 Jan. 27, 2022

(30) Foreign Application Priority Data

Nov. 27, 2018 (CN) .......................... 201811430204.3

(51) Int. Cl.
*H04L 67/51* (2022.01)

(52) U.S. Cl.
CPC .................................. *H04L 67/51* (2022.05)

(58) Field of Classification Search
CPC ........................... H04L 67/2833; H04L 67/16
See application file for complete search history.

(56) References Cited

U.S. PATENT DOCUMENTS

| | | | |
|---|---|---|---|
| 9,910,651 | B2 | 3/2018 | Lopez et al. |
| 2010/0115490 | A1 | 5/2010 | Wilcock et al. |

(Continued)

FOREIGN PATENT DOCUMENTS

| | | |
|---|---|---|
| CN | 106293704 A | 1/2017 |
| CN | 106603583 A | 4/2017 |
| CN | 107911430 A | 4/2018 |

OTHER PUBLICATIONS

WIPO, International Search Report dated Jan. 22, 2020.
European Patent Office, Extended European Search Report dated Jun. 15, 2022, for corresponding EP application No. 19889837.1.

*Primary Examiner* — S M A Rahman
(74) *Attorney, Agent, or Firm* — Li & Cai Intellectual Property (USA) Office (57) ABSTRACT

The embodiments of the present disclosure relate to a method, apparatus and device for generating a microservice, and a storage medium. The method includes: determining a service set of a microservice according to a first user requirement; determining a deployment mode of devices controlled by the microservice; determining parameter information of the microservice according to a second user requirement; and generating the microservice according to the service set, the deployment mode and the running parameters.

10 Claims, 5 Drawing Sheets

(56) References Cited

U.S. PATENT DOCUMENTS

| | | | |
|---|---|---|---|
| 2010/0153918 A1 | 6/2010 | Mallick et al. | |
| 2018/0088935 A1* | 3/2018 | Church | G06F 11/3051 |
| 2018/0159747 A1* | 6/2018 | Chang | H04L 41/5045 |
| 2018/0357055 A1* | 12/2018 | Apte | G06F 8/51 |
| 2018/0359218 A1* | 12/2018 | Church | H04L 43/062 |
| 2019/0320038 A1* | 10/2019 | Walsh | G06F 9/542 |
| 2020/0050494 A1* | 2/2020 | Bartfai-Walcott | G06F 9/5083 |
| 2020/0133738 A1* | 4/2020 | Junior | G06F 9/5077 |

* cited by examiner

FIG. 1

PROJECT BASIC INFORMATION:

PROJECT NAME (MANDATORY): ROUTER MICROSERVICE

PRODUCT LABEL (MANDATORY): MSE ▼ M6000 ▼

VERSION (MANDATORY): ZXROSNG-W1.00.30 ▼

CODE PATH (OPTIONAL):

FIG. 2A

PROJECT BASIC INFORMATION:

PROJECT NAME (MANDATORY): SWITCH MICROSERVICE

PRODUCT LABEL (MANDATORY): SWITCH ▼ 99 ▼

VERSION (MANDATORY): ZXROSNG-W1.00.30 ▼

CODE PATH (OPTIONAL):

| | |
|---|---|
| CPU SELECTION: | X86_64 ▼ |
| OS SELECTION: | LINUX ▼ |
| TOOL CHAIN SELECTION: | _GCC4.8.2 ▼ |
| OPTION OF GENERATED VERSION: | debug ▼ |

METHOD, APPARATUS AND DEVICE FOR GENERATING MICROSERVICE, AND STORAGE MEDIUM

CROSS-REFERENCE TO RELATED APPLICATION

The present disclosure claims priority from Chinese patent application No. CN201811430204.3 entitled "METHOD, APPARATUS AND DEVICE FOR GENERATING MICROSERVICE AND STORAGE MEDIUM" filed on Nov. 27, 2018, the entire contents of which are incorporated herein by reference.

TECHNICAL FIELD

Embodiments of the present disclosure relate to the field of communications, and particularly relates to a method, apparatus and device for generating a microservice, and a storage medium.

BACKGROUND

Microservice is a software architecture that develops a single application using a set of small services each running in its own process and communicates by a lightweight mechanism. These services are constructed based on service capacity, and can be independently deployed with an automatic deployment mechanism. These services are implemented with different programming languages, stored by using different data storage technologies, and kept with the minimum centralized management.

A single application generally integrates all services together to realize coupling among the services, while microservice applications refer to an application consisting of a series of small services. However, with expanded services, the single application will confront problems such as low running speed, large volume, tight coupling, difficulty in upgrading and downgrading, complex operation and maintenance, and the like, while an application consisting of a large number of microservices will confront problems such as high deployment cost and high operation and maintenance cost.

SUMMARY

In order to solve the above technical problems, embodiments of the present disclosure provide a method, apparatus and device for generating a microservice, and a storage medium.

In a first aspect, an embodiment of the present disclosure provides a method for generating a microservice, the method including: determining a service set of a microservice according to a first user requirement; determining a deployment mode of devices controlled by the microservice; determining parameter information of the microservice according to a second user requirement; and generating the microservice according to the service set, the deployment mode and the running parameters.

In a second aspect, an embodiment of the present disclosure provides an apparatus for generating a microservice, the apparatus including: a determining module configured to determine a service set of a microservice according to a first user requirement, the determination module being further configured to determine a deployment mode of devices controlled by the microservice, and the determination module being further configured to determine parameter information of the microservices according to a second user requirement; and a generation module configured to generate the microservice according to the service set, the deployment mode and the running parameters.

In a third aspect, an embodiment of the present disclosure provides an device for generating a microservice, the device including a processor and a memory; wherein the processor is configured to execute a microservice generation program stored on the memory to implement the method for generating a microservice according to the first aspect.

In a fourth aspect, an embodiment of the present disclosure provides a non-transitory computer-readable storage medium having one or more programs stored thereon, the one or more programs being executable by one or more processors to implement the method for generating a microservice according to the second aspect.

DETAILED DESCRIPTION

To make the objects, technical solutions, and advantages of the embodiments of the disclosure clearer, the technical solutions in the embodiments of this disclosure will now be described clearly and completely with reference to the accompanying drawings of the embodiments of the disclosure. Obviously, the described embodiments are only a part, not all, of the embodiments of the disclosure. All other embodiments obtained by the ordinarily skilled in the art based on the embodiments of the present disclosure without paying any creative effort shall be included in the protection scope of the present disclosure.

For the convenience of understanding of the embodiments of the present disclosure, the following description will be further explained with reference to the accompanying drawings, which are not intended to limit the embodiments of the present disclosure.

Figure 1:
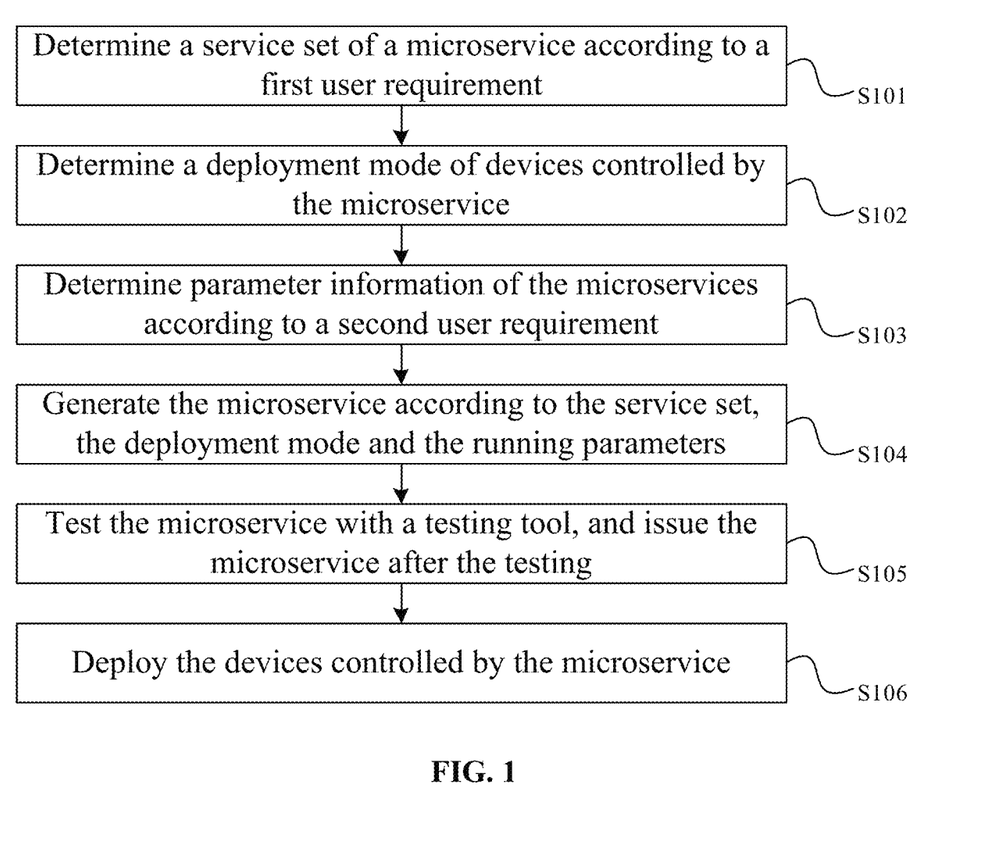
FIG. 1 is a schematic flowchart of a method for generating a microservice according to an embodiment of the present disclosure.
Figure 2A:
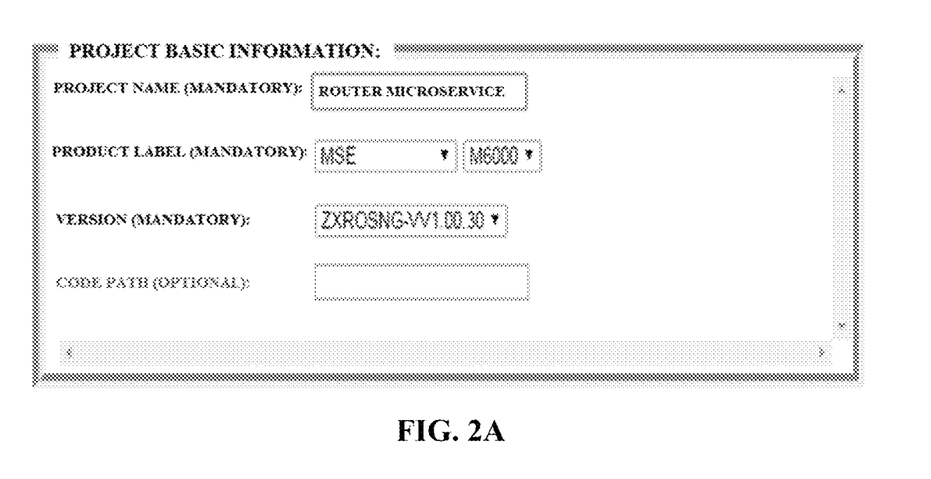
FIG. 2 is a schematic diagram showing customization of microservices according to a project requirement according to an embodiment of the present disclosure.
Figure 2B:
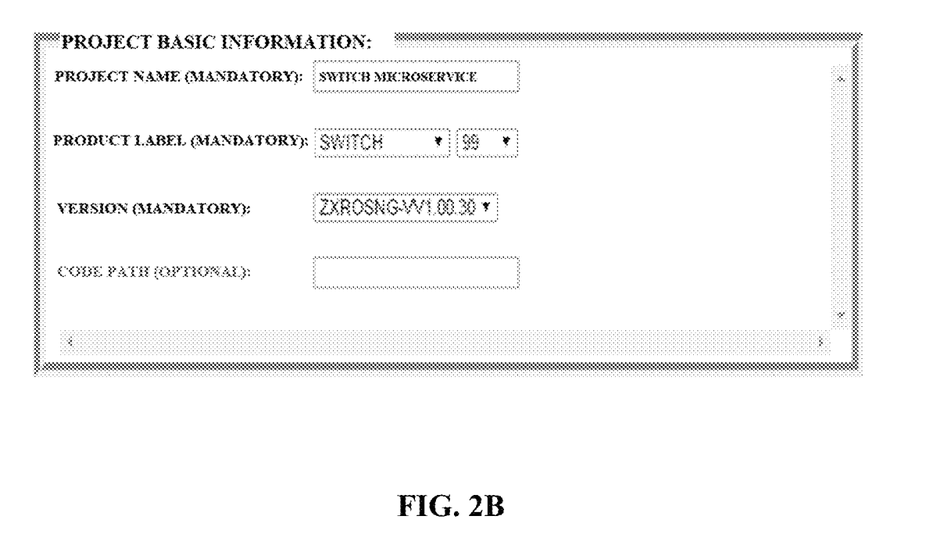
Figure 2C:
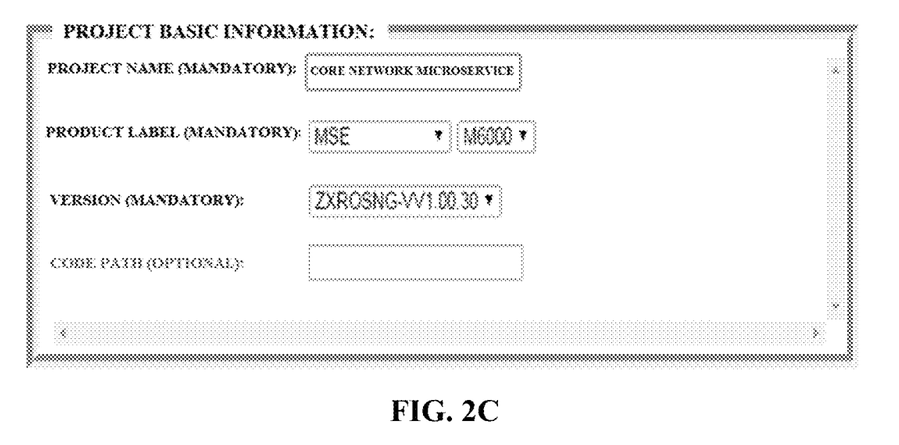
Figure 2D:
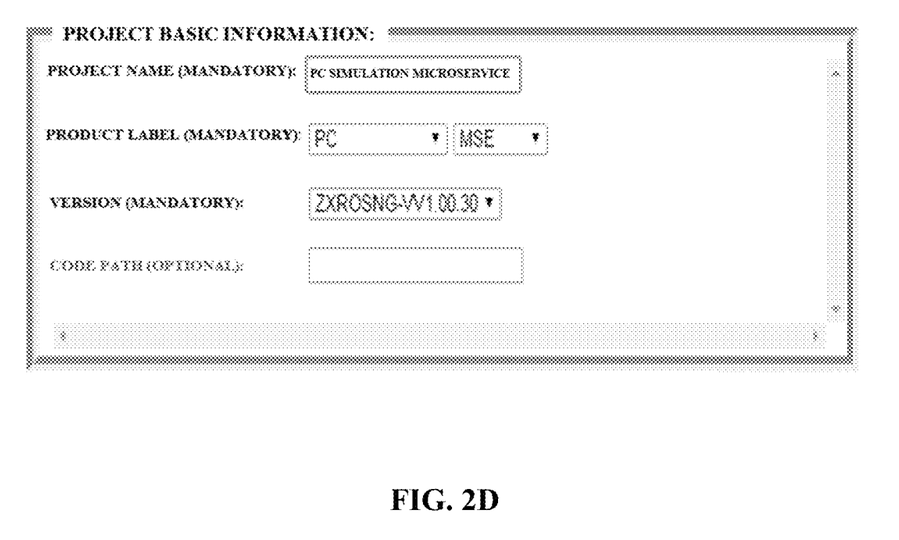

FIG. 1 is a schematic flowchart of a method for generating a microservice according to an embodiment of the present disclosure. As shown in FIG. 1, the method includes the following steps S101 to S106.

At S101, determining a service set of a microservice according to a first user requirement.

The method, provided in this embodiment, for generating a microservice may customize the microservice(s) according to a requirement of a user, and determine a service set of the microservice according to a first user requirement. The first user requirement includes at least one of: a project requirement, an application scenario requirement, or a service (business) requirement.

In an embodiment, the project requirement may be, but is not limited to: requirement of devices to be controlled by the user through a microservice, such as a router microservice, a switch microservice, a core network microservice or a PC simulation microservice, and the like; the application scenario requirement may be, but is not limited to: application scenarios of the device controlled by the user through the microservice, wherein in this implementation, the application scenario may be customized according to the user requirement in addition to being selected by the user based on his/her requirement; and the service requirement may be, but is not limited to: certain service functions of the device controlled by the user through the microservice.

It should be noted that: in this embodiment, a microservice may be customized according to one or more of the first user requirements. Referring to FIG. 2, it is possible to customize a microservice according to a project requirement, such as to customize a router microservice (a), a switch microservice (b), a core network microservice (c) or a PC simulation microservice (d). When a service set of the microservice is determined according to the project requirement, the service set is a largest set of functions, equivalent to generating a single application version. That is, the microservice contains all service functions of a router, all service functions of a switch, all service functions of a core network, and all service functions of PC simulation. In this version, a user may select different forms of microservices according to the controlled device in different application scenarios.

Figure 3:
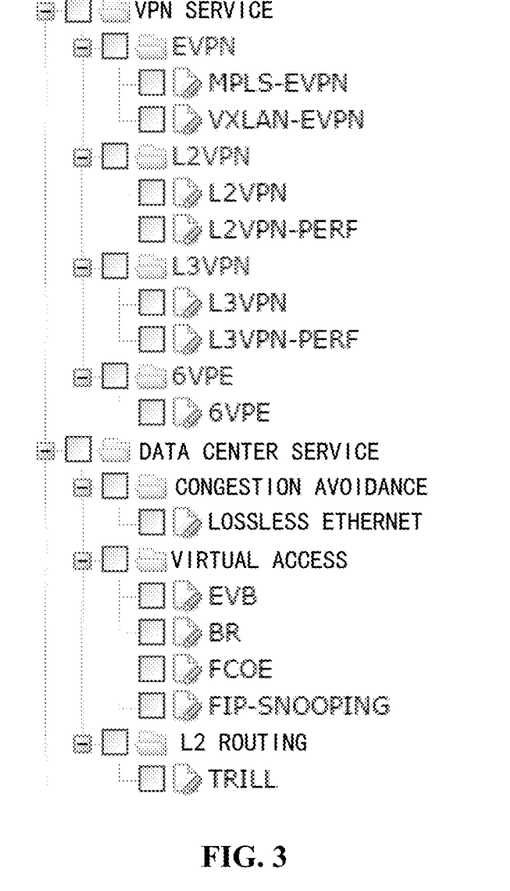
FIG. 3 is a schematic diagram showing customization of microservices according to a service requirement according to an embodiment of the present disclosure.

Referring to FIG. 3, the service set of the microservice may be determined according to a service requirement, e.g., to customize a microservice such as VPN, a data center service, or the like. When the service set of the microservice is determined according to the service requirement, the service set is a smallest set of functions, equivalent to generating a microservice version with a minimum granularity. The microservice of such version only includes VPN and data center services. By customizing the microservice according to the service requirement, it is possible to remove service functions unwanted by the user while remaining the desired service functions, thereby reducing complexity of the microservice, and simplifying the operation and maintenance cost.

In an embodiment, the service set of the microservice may be determined according to both the project requirement and the service requirement, which can be understood as: adding services of other service functions except the current project while customizing the version of microservice of a single application, thereby enriching the management function of the microservice.

The project requirement, the application scenario requirement, or the service requirement may be selected for customizing the microservice according to the actual requirement of the user; and in addition to the forms of customized microservices shown in FIG. 2 or FIG. 3, other forms may also be used for customizing the microservice, which are not limited in this embodiment.

At S102, determining a deployment mode of devices controlled by the microservice.

A deployment mode of the devices controlled by the microservice is determined according to the first user requirement, which may include determining a deployment mode of the devices controlled by the microservice according to a project requirement in the first user requirement, for example, selecting a corresponding deployment mode according to requirements of a project on the memory and/or security, wherein the deployment mode includes: physical location deployment and process architecture deployment; wherein the physical location deployment includes at least one of: a centralized mode, a distributed mode, or a hybrid mode; and the process architecture deployment includes: a compact mode and/or a safe mode.

For example, devices in a cloud environment may be deployed in a centralized mode, Rack-type physical devices may be deployed in a distributed mode, and devices in a more complex environment may be deployed in a hybrid mode. For some miniaturized devices with a small memory, a compact mode may be adopted for deployment to reduce the memory consumption, while for some large-scale devices, a safe mode may be adopted for deployment to enable different service processes to restart independently.

At S103, determining parameter information of the microservice according to a second user requirement.

In this embodiment, parameter information of the microservice may be determined according to a second user requirement, wherein the second user requirement includes: a running requirement of a user for running the microservice, and the parameter information includes at least one of: a running environment, a CPU type, or an operating system.

In an embodiment, by determining parameter information of the microservice according to the second user requirement, it is ensured that when the user uses the microservice in person, the running environment, the CPU type or the operating system of the microservice is matched with a carrier supporting running of the microservice, thereby avoiding the problem of compatibility. That is, in this embodiment, a microservice can be customized in accordance with a version requirement of the user, or, customized microservices with the same version may provide capabilities in various running environments for selection by the user.

Figure 4:
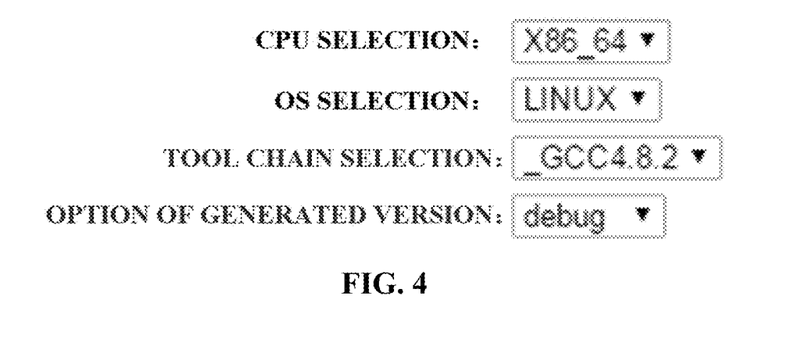
FIG. 4 is a schematic diagram showing customization of microservices according a second user requirement according to an embodiment of the present disclosure.

For example, referring to FIG. 4, according to the second user requirement, versions based on different operating systems such as LINUX, CGSL, or the like, may be customized; versions based on 32-bit, 64-bit CPUs may be customized; versions with GCC 4.8.2, GCC 4.5.2 may be customized; and versions of debug, release, or the like, may also be customized.

At S104, generating the microservice according to the service set, the deployment mode and the running parameters (the parameter information).

In this embodiment, a display interface of the microservice may be embodied in the form of a list, which may include various service interfaces; and during development of the microservice, services, functions, components, elements, relations, and the like of the microservice need to be defined.

In an embodiment, functions of individual services in the microservices, components contained in the functions, elements used in the components, instances corresponding to the elements and relations among the services are defined in the list of the various service interfaces.

In an embodiment, when the above definition is completed, the microservice is generated based on the above definition and according to the service set, the deployment mode and the running parameters.

At S105, testing the microservice with a testing tool, and issuing the microservice after the testing.

At S106, deploying the devices controlled by the microservice.

In this embodiment, after the microservice is generated, a DEVOPS tool may be used for testing and issuing the microservice, and after the test and the issuance are completed, the devices controlled by the microservice may be deployed according to the microservice.

In the solution for generating a microservice provided in the embodiments of this disclosure, by determining a service set of a microservice according to a first user requirement; determining a deployment mode of devices controlled by the microservice; determining parameter information of the microservice according to a second user requirement; and generating the microservice according to the service set, the deployment mode and the running parameters, various service functions of the microservice can be determined according to the user requirements so that the microservice can be customized in accordance with actual requirements of the user, and the deployment mode of the devices is determined according to the characteristics of the microservice, thereby reducing the complexity of application deployment, and simplifying later operation and maintenance processes.

Figure 5:
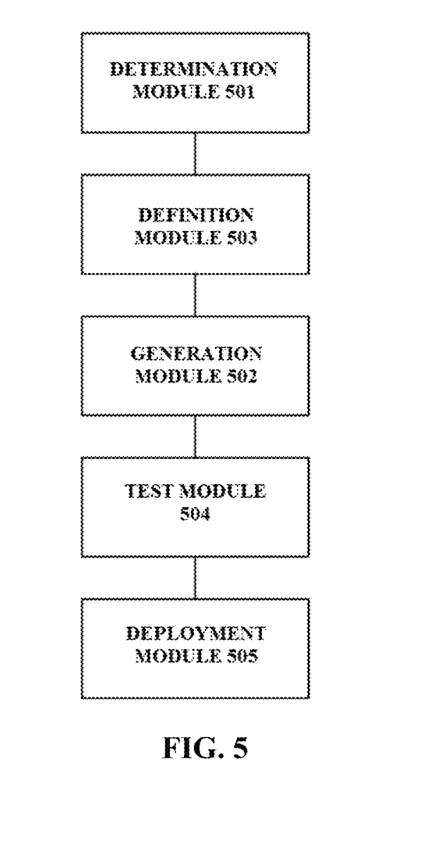
FIG. 5 is a schematic structural diagram of an apparatus for generating a microservice according to an embodiment of the present disclosure.

FIG. 5 is a schematic structural diagram of an apparatus for generating a microservice according to an embodiment of the present disclosure. As shown in FIG. 5, the apparatus includes: a determination module 501 configured to determine a service set of a microservice according to a first user requirement, the determination module 501 being further configured to determine a deployment mode of devices controlled by the microservice, and the determination module 501 being further configured to determine parameter information of the microservices according to a second user requirement; and a generation module 502 configured to generate the microservice according to the service set, the deployment mode and the running parameters.

In an embodiment, the first user requirement includes at least one of: a project requirement, an application scenario requirement, or a service requirement; and the second user requirement includes: a running requirement of a user for running the microservice.

In an embodiment, the deployment mode includes: physical location deployment and process architecture deployment; wherein the physical location deployment includes at least one of: a centralized mode, a distributed mode, or a hybrid mode; and the process architecture deployment includes: a compact mode and/or a safe mode.

In an embodiment, the parameter information includes at least one of: a running environment, a CPU type, or an operating system.

In an embodiment, the microservice includes various service interfaces generated in the form of a list.

In an embodiment, the apparatus further includes a definition module 503 which is configured to define functions of individual services in the microservices, components contained in the functions, elements used in the components, instances corresponding to the elements and relations among the services in the list of the various service interfaces.

In an embodiment, the apparatus further includes a test module 504 which is configured to test the microservice with a testing tool, and issue the microservice after the testing; and a deployment module 505 configured to deploy the devices controlled by the microservice.

The apparatus for generating a microservice provided in this embodiment may be the apparatus for generating a microservice shown in FIG. 5, and may perform all steps of the method for generating a microservice shown in FIG. 1, so as to achieve the technical effect of the method for generating a microservice shown in FIG. 1. Reference may be made to related description of FIG. 1, which, for brevity, is not repeated here.

Figure 6:
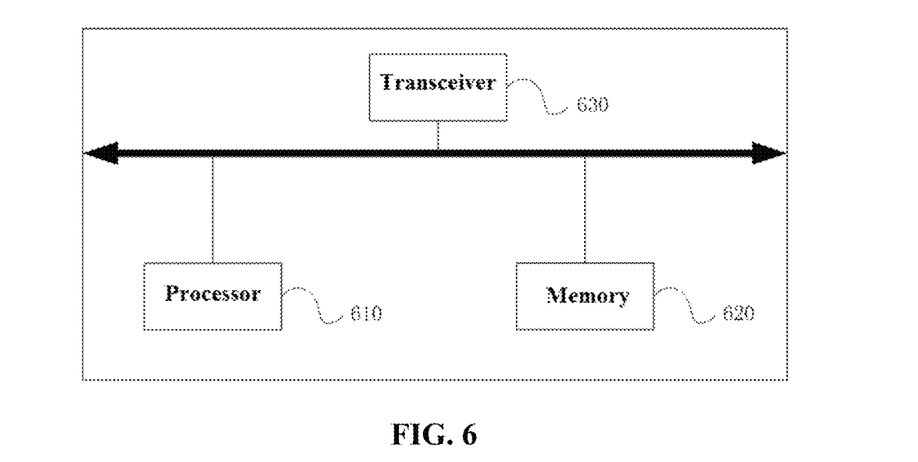
FIG. 6 is a schematic diagram showing a hardware structure of an apparatus for generating a microservice according to an embodiment of the present disclosure.

FIG. 6 is a schematic diagram showing a hardware structure of an device for generating a microservice according to an embodiment of the present disclosure. As shown in FIG. 6, the device includes a processor 610, a memory 620, and a transceiver 630.

The processor 610 may be a Central Processing Unit (CPU), or a combination of a CPU and a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 620 is configured to store various applications, operating systems and data. The memory 620 may transmit the stored data to the processor 610. The memory 620 may include a volatile memory, a nonvolatile random access memory (NVRAM), a phase change RAM (PRAM), a magnetoresistive RAM (MRAM), and the like, such as at least one magnetic disk memory device, electrically erasable programmable read-only memory (EEPROM), flash memory device such as NOR flash memory or NAND flash memory, semiconductor device such as a solid state disk (SSD), and the like. The memory 620 may include a combination of the memories as described above.

The transceiver 630 is configured to transmit and/or receive data, and may be an antenna, or the like.

The working process of each device is as follows: the processor 610 is configured to determine a service set of a microservice according to a first user requirement; determine a deployment mode of devices controlled by the microservice; and determine parameter information of the microservices according to a second user requirement; and generate the microservice according to the service set, the deployment mode and the running parameters.

In an embodiment, the processor 610 is configured to configure the first user requirement and the second user requirement, the first user requirement including at least one of: a project requirement, an application scenario requirement, or a service requirement; and the second user requirement including: a running requirement of a user for running the microservice.

In an embodiment, the processor 610 is configured to configure the deployment mode including: physical location deployment and process architecture deployment; wherein the physical location deployment includes at least one of: a centralized mode, a distributed mode, or a hybrid mode; and the process architecture deployment includes: a compact mode and/or a safe mode.

In an embodiment, the processor 610 is configured to configure the parameter information including at least one of: a running environment, a CPU type, or an operating system.

In an embodiment, the processor 610 is configured to configure the microservice including various service interfaces generated in the form of a list.

In an embodiment, the processor 610 is further configured to define functions of individual services in the microservices, components contained in the functions, elements used in the components, instances corresponding to the elements and relations among the services in the list of the various service interfaces.

In an embodiment, the processor 610 is further configured to test the microservice with a testing tool, issue the microservice after the testing; and deploy the devices controlled by the microservice.

The device for generating a microservice provided in this embodiment may be the device for generating a microservice shown in FIG. 6, and may perform all steps of the method for generating a microservice shown in FIG. 1, so as to achieve the technical effect of the method for generating a microservice shown in FIG. 1. Reference may be made to related description of FIG. 1, which, for brevity, is not repeated here.

In an embodiment of the present disclosure, there is further provided a storage medium (computer-readable storage medium). The storage medium has one or more programs stored thereon. The storage medium may include a volatile memory such as a random access memory. The memory may include a nonvolatile memory, such as a read only memory, a flash memory, a hard disk, or a solid state disk. The memory may include a combination of memories as described above.

The one or more programs on the storage medium may be executed by one or more processors to cause the method for generating a microservice to be implemented at the side of the device for generating a microservice.

The processor is configured to execute a microservice generation program stored on the memory to implement the following steps of the method for generating a microservice to be implemented at the side of the device for generating a microservice: determining a service set of a microservice according to a first user requirement; determining a deployment mode of devices controlled by the microservice; determining parameter information of the microservice according to a second user requirement; and generating the microservice according to the service set, the deployment mode and the running parameters.

In an embodiment, the first user requirement includes at least one of: a project requirement, an application scenario requirement, or a service requirement; and the second user requirement includes: a running requirement of a user for running the microservice.

In an embodiment, the deployment mode includes: physical location deployment and process architecture deployment; wherein the physical location deployment includes at least one of: a centralized mode, a distributed mode, or a hybrid mode; and the process architecture deployment includes: a compact mode and/or a safe mode.

In an embodiment, the parameter information includes at least one of: a running environment, a CPU type, or an operating system.

In an embodiment, the microservice includes various service interfaces generated in the form of a list.

In an embodiment, functions of individual services in the microservices, components contained in the functions, elements used in the components, instances corresponding to the elements and relations among the services are defined in the list of the various service interfaces.

In an embodiment, the microservice is tested with a testing tool, and issued after the testing; and then the devices controlled by the microservice are deployed.

Those skilled in the art will further appreciate that the units and algorithm steps of various examples described in combination with the embodiments disclosed herein may be implemented as electronic hardware, computer software, or a combination of the two, and that the components and steps of the various examples have been described above generally in terms of their functionality to clearly illustrate the interchangeability of hardware and software. Whether such functionality is implemented as hardware or software depends on the particular application and design constraints imposed on the technical solution. Those skilled in the art may implement the described functionality in varying ways for each particular application, but such implementations should not be interpreted as departing from the scope of the present disclosure.

The steps of the method or algorithm described in combination with the embodiments disclosed herein may be embodied in hardware, a software module executed by a processor, or a combination of the two. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the solution for generating a microservice provided in the embodiment of the disclosure, by determining a service set of a microservice according to a first user requirement; determining a deployment mode of devices controlled by the microservice; determining parameter information of the microservice according to a second user requirement; and generating the microservice according to the service set, the deployment mode and the running parameters, various service functions of the microservice can be determined according to the user requirements so that the microservice can be customized in accordance with actual requirements of the user, and the deployment mode of the devices is determined according to the characteristics of the microservice, thereby reducing the complexity of application deployment, and simplifying later operation and maintenance processes.

The objects, technical solutions and advantages of the present disclosure are further described in detail through the above implementations, but it is to be understood that the above are merely implementations of the present disclosure and are not intended to limit the present disclosure. Any amendments, equivalent substitutions, improvements, etc. within the principle of the disclosure are all included in the scope of the protection defined by the appended claims of the disclosure.

What is claimed is:

1. A method for generating a microservice, comprising:
   determining a service set of a microservice according to a first user requirement;
   determining a deployment mode of devices controlled by the microservice;
   determining parameter information of the microservice according to a second user requirement; and
   generating the microservice according to the service set, the deployment mode and the parameter information which serves as running parameters,
   wherein the deployment mode comprises: physical location deployment and process architecture deployment;
   wherein the physical location deployment comprises at least one of: a centralized mode, a distributed mode, or a hybrid mode; and
   the process architecture deployment comprises at least one of: a compact mode, or a safe mode.

2. The method according to claim 1, wherein the first user requirement comprises at least one of:
   a project requirement, an application scenario requirement, or a service requirement; and
   the second user requirement comprises: a running requirement of a user for running the microservice.

3. The method according to claim 1, wherein the parameter information comprises at least one of:

a running environment, a CPU type, or an operating system.

4. The method according to claim 3, wherein the microservice comprises various service interfaces generated in the form of a list.

5. The method according to claim 4, wherein the method further comprises:
 defining functions of individual services in the microservice, components contained in the functions, elements used in the components, instances corresponding to the elements and relations among the services in the list of the various service interfaces.

6. The method according to claim 3, wherein the method further comprises:
 testing the microservice with a testing tool, and issuing the microservice after the testing; and
 deploying the devices controlled by the microservice.

7. An device for generating a microservice, wherein the device comprises a processor and a memory; wherein the processor is configured to execute a microservice generation program stored on the memory to implement the method for generating a microservice according to claim 1.

8. A non-transitory computer-readable storage medium having one or more programs stored thereon, the one or more programs being executable by one or more processors to implement the method for generating a microservice according to claim 1.

9. The method according to claim 2, wherein the deployment mode comprises: physical location deployment and process architecture deployment;
 wherein the physical location deployment comprises at least one of: a centralized mode, a distributed mode, or a hybrid mode; and
 the process architecture deployment comprises: a compact mode and/or a safe mode.

10. The method according to claim 5, wherein the method further comprises:
 testing the microservice with a testing tool, and issuing the microservice after the testing; and
 deploying the devices controlled by the microservice.

* * * * *